May 14, 1963   R. CLAAS   3,089,299
STONE TRAP FOR COMBINES
Filed Oct. 25, 1960

INVENTOR
Reinhold Claas
BY Michael S. Striker
Attorney

United States Patent Office 3,089,299
Patented May 14, 1963

3,089,299
STONE TRAP FOR COMBINES
Reinhold Claas, Harsewinkel, Westphalia, Germany, assignor to Gebr. Claas, Harsewinkel, Westphalia, Germany, a firm
Filed Oct. 25, 1960, Ser. No. 64,948
Claims priority, application Germany Oct. 29, 1959
7 Claims. (Cl. 56—20)

This invention relates to combine harvesters, and more specifically to a combine harvester equipped with conveyor means for delivering the harvested crop transversely across the direction of travel to a threshing mechanism consisting of a threshing drum and a concave preceded by a stone catcher trough.

In the operation of threshing machines, particularly of combine harvesters, there is always the risk that stones, pieces of wood, and the like, will be carried into the threshing mechanism and damage the same. It is already known in the art to meet this risk by providing a stone catcher trough in front of the receiving edge of the concave of the threshing mechanism. However, the presence of this trough generally affects the efficiency of the threshing mechanism because it reduces the effective length of the concave in the direction of passage of the threshed crop.

The object envisaged by the present invention is to eliminate the aforementioned drawback in that the combine harvester of the above specified kind is suitably equipped for preventing stones and other foreign material from entering the threshing mechanism and causing damage.

The invention achieves this object by providing a stone catcher trough extending across only part of the width of the entry edge of the concave.

This arrangement offers a satisfactory solution because experience has shown that foreign material which should be prevented from entering the threshing mechanism, especially in combine harvesters equipped with transversely operating conveyor means, does not usually arrive uniformly distributed across the operational width of the threshing mechanism, but tends to be concentrated within a comparatively narrow preferred region as it arrives at the receiving end of the threshing mechanism. The invention therefore proposes to limit the lateral length of the stone catcher trough to that region in which such foreign material tends to arrive at the threshing mechanism. The practical embodiment of this proposal therefore permits the remaining part of the entry end of the threshing mechanism to be left without a stone catcher trough and thus to work at optimum efficiency. Especially in combine harvesters with transverse conveyor means the region within which foreign bodies tend to enter the threshing mechanism coincides with that side of the threshing mechanism which receives the stubble ends of the haulms, so that the presence of a stone catcher trough in this region does not, in fact, reduce the operational efficiency of the threshing mechanisms below that which would be achieved if a stone catcher trough were entirely absent. Nevertheless, the provision of the stone catcher trough according to the invention reliably intercepts all foreign bodies which might otherwise cause damage to the threshing mechanism and thus give rise to operational trouble. Experience has also confirmed that in combine harvesters wherein the crop is delivered to threshing mechanism in the direction of travel the vibrations set up in operation similarly tend to move foreign bodies, such as stones thrown on to the cutter platform, into preferential regions across the width of the concave so that even in combine harvesters of the latter kind an arrangement according to the invention may occasionally be of advantage and reliably prevent trouble.

The invention may be embodied in various ways. In a preferred form of construction it is proposed to provide a stone catcher trough below a recess cut into the entry edge of the concave. This is an arrangement which makes satisfactory use of the available space. The stone catcher trough which is confined to a portion of the working width of the threshing mechanism may be provided with a retractable and detachable cover for inactivating the trough whenever it is not desired to use it. The cover may then be of similar construction to the concave and thus permit the full width of the concave to be used for instance when working the combine harvester with a pick-up reel for windowing. When the combine harvester is used for cutting a standing crop, the cover plate may be retracted or taken out of the machine so as to bring the trough into a condition for intercepting stones.

According to another feature of the invention, it is preferred that the inner cross section of the trough should widen from the upper opening of the trough in downward direction. This increases the capacity of the trough for holding stones and lengthens the intervals at which the trough must be cleared. Another advantageous feature of such a trough is a floor which slopes downwards from one longitudinal wall of the trough to the other, the lower end of the floor being preferably that which joins the longitudinal wall on the entry side. This form of construction creates a pocket in which foreign bodies can be collected and which can easily be cleaned.

A preferred embodiment of the invention will now be described by way of example and with reference to the accompanying drawings, in which.

Figure 1:
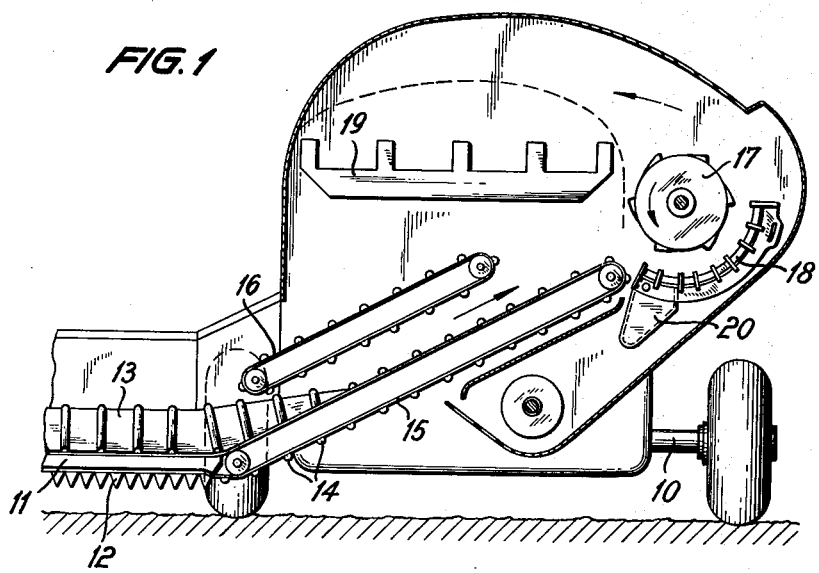
FIG. 1 is a front elevational view, partly in section, of a two-wheeled combine harvester adapted to be hitched to a tractor.
Figure 2:
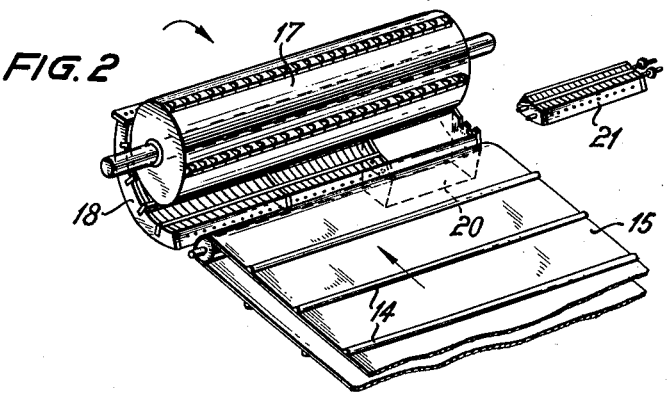
FIG. 2 is a perspective view of the threshing mechanism.
Figure 3:
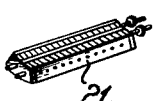
FIG. 3 is a perspective view of a cover for closing the stone catcher trough.
Figure 4:
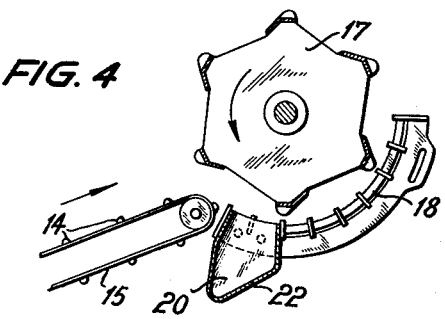
FIG. 4 is a cross section through the threshing mechanism shown on an enlarged scale.

The combine harvester illustrated in FIG. 1 is mounted on an axle 10 and is equipped with a cutter platform 11 with a cutter 12. The latter may be replaced by pick-up means. The crop received on the platform is then delivered by conveyor means 13 comprising a belt 15 with cross battens 14 to a threshing mechanism. In conventional manner a second belt 16 may be provided for improving the reliability of the feed. The threshing mechanism substantially consists of a threshing drum 17 which revolves in operation, and an associated concave 18. The threshed crop leaving the threshing mechanism is discharged on to a shaker 19 or a dresser. As will be understood more particularly by reference to FIG. 2, the edge of the concave 18 on the entry side of the threshing mechanism does not extend across the full width of the drum but is provided at one end with a recess below which is located a stone catcher trough 20 which forms a trap for stones. The length of the trough across the concave is limited in the illustrated example to about one-third of the width of the threshing mechanism. This trough 20 is located in that region of the width of the threshing mechanism where foreign bodies such as stones and the like principally tend to be delivered by the conveyor means. In a combine harvester of the kind shown in the drawings this is the forward end in the direction of travel of the machine where the stubble ends of the haulms are delivered. Consequently the presence of the recess in the concave in this region will in fact not affect the efficiency of the threshing mechanism. If there is no risk of stones or the like reaching the threshing mechanism, the stone catcher trough 20 may be closed by a cover 21 which, as shown in FIG. 3, is of similar construction to the concave. When the cover is in position the threshing effect will therefore be uniform across the entire width of the concave. With reference to the shape of the trough it is preferred, in the manner shown in FIG. 4, to construct the stone catcher trough in such a way that its clear width increases in downward direction from its upper opening, and to provide it with a floor 22 which slopes downward towards one of its longitudinal walls, preferably the longitudinal wall facing the incoming crop. The trough thus forms a kind of pocket for the reception of foreign bodies and therefore needs clearing only at major intervals of time. Moreover, it permits the work of clearing to be done quickly as well as effectively.

The illustrated embodiment is intended merely to exemplify the invention and not to limit its scope. Various alternative forms of construction and other applications may be envisaged. The dimensions of the stone catcher trough may be varied to suit existing conditions. Moreover, the cover for inactivating the trough may be a tiltable member or it may be arranged to be retractable in some other way, remaining in the machine when the trough is in use. Furthermore, the invention can be applied to combine harvesters of other types in which experience has shown that foreign bodies tend to be carried to the threshing mechanism in preferential localized regions across the width of the concave.

I claim:

1. In a combine harvester adapted to travel in one direction, in combination, a threshing drum; a concave cooperating with said drum and having an entry edge portion; cutting means for cutting stalks of a crop to be threshed adjacent to the root ends thereof; elongated feeding means having a side edge leading in said one direction for feeding the cut stalks in a direction transverse to said one direction toward said entry edge portion of said concave with the cut ends of the stalks located along said leading side edge of said elongated feeding means; and a stone catcher trough extending only across part of the entry edge portion of said concave and located in the region of a continuation of said one side edge of said feeding means.

2. An arrangement as defined in claim 1 and including a detachable cover for closing said stone catcher trough.

3. An arrangement as defined in claim 2 in which said detachable cover has the same curvature as said concave.

4. A combine harvester, as claimed in claim 1, wherein the stone catcher trough is located below a recess cut into the entry edge of the concave.

5. A combine harvester, as claimed in claim 1, wherein the stone catcher trough has a cross section downwardly widening from the upper opening.

6. A combine harvester, as claimed in claim 5, wherein the stone catcher trough has a sloping floor.

7. A combine harvester, as claimed in claim 6, wherein the floor slopes downward towards a transverse wall of the stone catcher trough located closest to said feeding means.

References Cited in the file of this patent

UNITED STATES PATENTS

| | | |
|---|---|---|
| 2,841,945 | Brenner | July 8, 1958 |
| 2,959,175 | Oberholtz et al. | Nov. 8, 1960 |

FOREIGN PATENTS

| | | |
|---|---|---|
| 467,475 | Canada | Aug. 22, 1950 |